(12) United States Patent
Kache et al.

(10) Patent No.: US 9,342,536 B2
(45) Date of Patent: May 17, 2016

(54) INTENT BASED AUTOMATION OF DATA MANAGEMENT OPERATIONS BY A DATA MANAGEMENT ENGINE

(75) Inventors: Holger Kache, San Jose, CA (US); Jacques J. Labrie, Sunnyvale, CA (US); Veera Maddipati, Fremont, CA (US); Paulo R. R. Pereira, Grapevine, TX (US); Alan P. Plante, Holliston, MA (US); Charles D. Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 13/563,511

(22) Filed: Jul. 31, 2012

(65) Prior Publication Data

US 2014/0040183 A1 Feb. 6, 2014

(51) Int. Cl.
*G06F 7/00* (2006.01)
*G06F 17/30* (2006.01)

(52) U.S. Cl.
CPC .... *G06F 17/30289* (2013.01); *G06F 17/30365* (2013.01)

(58) Field of Classification Search
None
See application file for complete search history.

(56) References Cited

U.S. PATENT DOCUMENTS

| | | | | |
|---|---|---|---|---|
| 7,145,898 B1 * | 12/2006 | Elliott | ...................... | H04L 12/66 370/352 |
| 7,801,926 B2 * | 9/2010 | Hunter et al. | .................. | 707/802 |
| 8,141,040 B2 * | 3/2012 | Chaar et al. | ................... | 717/120 |
| 8,346,929 B1 * | 1/2013 | Lai | ......................... | G06Q 10/10 709/226 |
| 2002/0069267 A1 | 6/2002 | Thiele | | |
| 2003/0110155 A1 | 6/2003 | Minagawa | | |
| 2004/0162741 A1 * | 8/2004 | Flaxer | ..................... | G06Q 10/10 705/7.26 |
| 2006/0112130 A1 | 5/2006 | Lowson | | |
| 2006/0115798 A1 | 6/2006 | Wieckhorst et al. | | |
| 2007/0185934 A1 * | 8/2007 | Cannon | ............... | G06F 11/1451 |
| 2007/0294312 A1 * | 12/2007 | Seshadri et al. | .............. | 707/200 |
| 2008/0256506 A1 | 10/2008 | Chaar et al. | | |
| 2009/0089078 A1 * | 4/2009 | Bursey | .............................. | 705/1 |
| 2009/0171704 A1 * | 7/2009 | Bobak | .................... | G06Q 10/06 705/7.12 |
| 2009/0171708 A1 * | 7/2009 | Bobak | .................... | G06Q 10/06 705/7.27 |
| 2009/0254971 A1 * | 10/2009 | Herz | ....................... | G06Q 10/10 726/1 |
| 2010/0106656 A1 * | 4/2010 | Sheth et al. | .................... | 705/301 |
| 2011/0072505 A1 | 3/2011 | Ott | | |
| 2011/0214157 A1 * | 9/2011 | Korsunsky | .............. | G06F 21/55 726/1 |
| 2012/0030158 A1 | 2/2012 | Hofberg et al. | | |
| 2012/0239703 A1 * | 9/2012 | Blight et al. | .................. | 707/802 |

OTHER PUBLICATIONS

Reimann et al., "SIMPLE—A Framework for Accessing External Data in Simulation Workflows", Mar. 2011, Universitat Stuttgart SimTech pp. 1-21.*

(Continued)

*Primary Examiner* — Hexing Liu
(74) *Attorney, Agent, or Firm* — Janaki K. Davda; Konrad, Raynes, Davda & Victor LLP

(57) ABSTRACT

Provided are a method, computer program product, and system for processing a data management request. User intent that defines properties of target data is determined. Policies and constraints for the data management request are determined. An abstract data management request that identifies source data, the target data, and the polices and constraints is created. A technology to use to process the data management request based on the user intent, policies, and constraints is determined.

15 Claims, 16 Drawing Sheets

(56) References Cited

OTHER PUBLICATIONS

Preliminary Remarks, May 10, 2013, for U.S. Appl. No. 13/892,104, filed May 10, 2013 by H. Kache et al., Total 2 pp.

U.S. Appl. No. 13/892,104, filed May 10, 2013, entitled "Intent Based Automation of Data Management Operations by a Data Management Engine", invented by Kache, H., J.J. Labrie, V. Maddipati, P.R.R. Pereira, A.P. Plante, and C.D. Wolfson, Total 50 pp.

Hammer, M. et al., "Knowledge-Based Query Processing", [online], Laboratory for Computer Science, Massachusetts Institute of Technology, Cambridge, 1980, [Retrieved on Oct. 2, 2013], retrieved from the Internet at <URL: http://library.riphah.edu.pk/acm/disk_1/text/1-4/VLDB80/P137.pdf>, 11 pp.

Reimann, P., et al., "SIMPL—A Framework for Accessing External Data in Simulation Workflows", [online], Institute of Architecture of Application Systems (IAAS), University of Stuttgart, Mar. 2011, [Retrieved on Oct. 2, 2013], retrieved from the Internet at <URL: http://www.iaas.uni-stuttgart.de/RUS-data/INPROC-2011-07%20-SIMPL_BTW11.pdf>, 21 pp.

International Search Report for International Application No. PCT/CA2013/050533, dated Oct. 18, 2013, 2 pp.

Written Opinion for International Application No. PCT/CA2013/050533, dated Oct. 18, 2013, 4 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Rajasekar, A., R. Moore, M. Wan, and W. Schroeder, "Policy-based Distributed Data Management Systems", [Downloaded Jun. 25, 2012 from http://www.google.com/url?sa=t&rct=j&q=&esrc=s&source=web&cd=6&ved=0CG4QFjAF&url=http%3A%2F%2Fjournals.tdl.org%2Fjodi%2Farticle%2Fdownload%2F756%2F644&ei=l9m2T9KrAsHG2wW51d2oCQ&usg=AFQjCNFgvicrBm-0o_lOrW5j5_BeyMZThg&sig2=Q71kAw3uD5vnTgo53h9q-Q], Total 16 pp.

Rajasekar, A., R. Moore, M. Wan, and W. Schroeder, "Policy-based Distributed Data Management Systems", [Downloaded Jun. 25, 2012 from http://www.google.com/url?sa=t&rct=j&q=&esrc=s&source=web&cd=9&ved=0CHwQFjAI&url=http%3A%2F%2Fsmartech.gatech.edu%2Fjspui%2Fbitstream%2F1853%2F28455%2F1%2F28-334-1-PB.doc&ei=l9m2T9KrAsHG2wW51d2oCQ&usg=AFQjCNER-vGO8LfRb8tVeFnTcPpUoDt_4Q&sig2=GyOUlkhkZ3tFU-euYi5Hqw], Total 3 pp.

Office Action 1, Jul. 1, 2014, for U.S. Appl. No. 13/892,104, filed May 10, 2013 by H. Kache et al., Total 18 pp.

Response to Office Action, Oct. 31, 2014, for U.S. Appl. No. 13/892,104, filed May 10, 2013 by H. Kache et al., Total 7 pp.

Final Office Action 1, dated Mar. 6, 2015, for U.S. Appl. No. 13/892,104, 16 pp.

Response to Final Office Action 1, dated May 21, 2015, for U.S. Appl. No. 13/892,104, 7 pp.

Office Action 3, Sep. 28, 2015, for U.S. Appl. No. 13/892,104, filed May 10, 2013 by H. Kache et al., Total 16 pp.

Response to Office Action 3, Dec. 30, 2015, for U.S. Appl. No. 13/892,104, filed May 10, 2013 by H. Kache et al., Total 7 pp.

\* cited by examiner

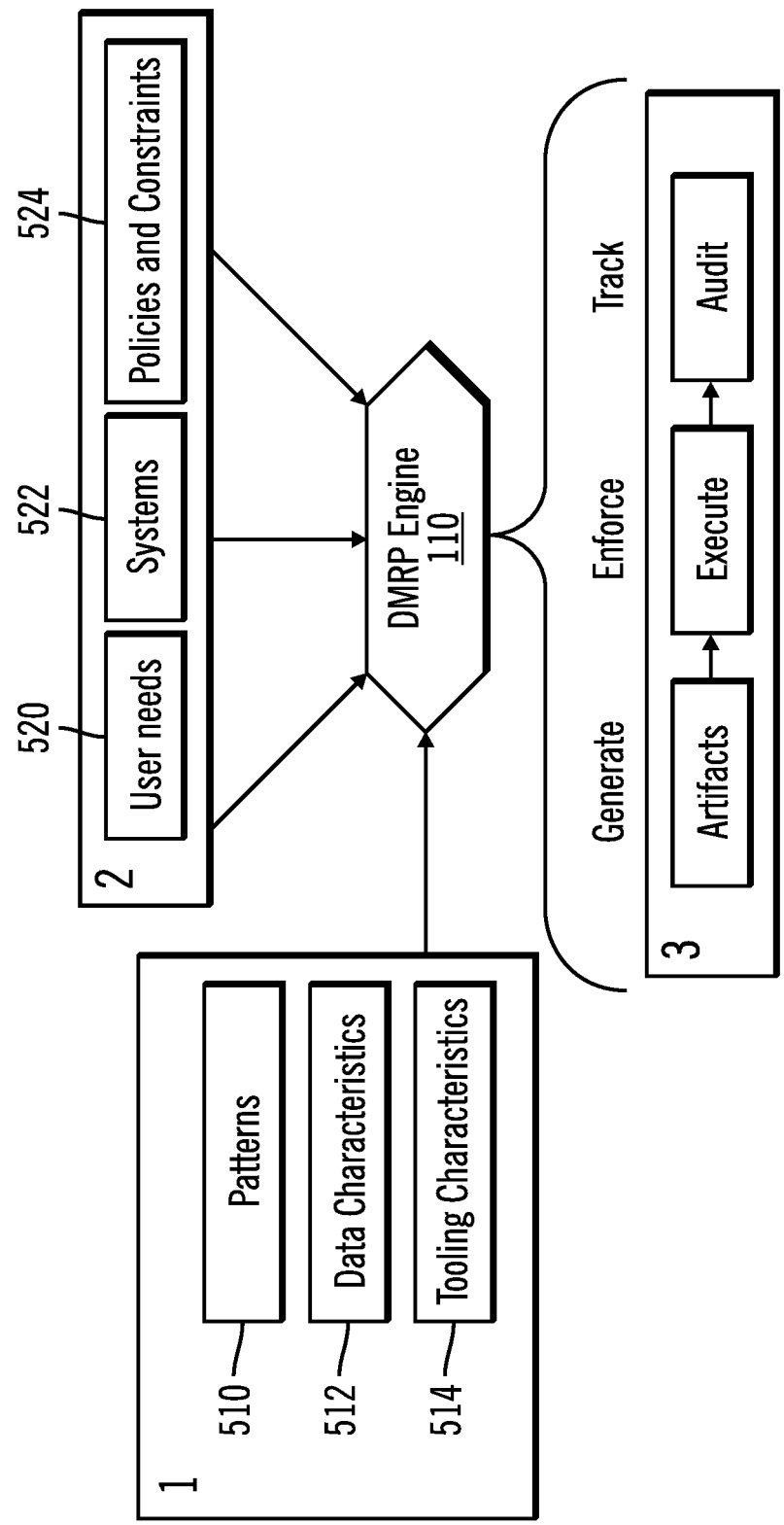

900

| Installed components | Source and target databases | Update frequency | User specified limits (filtering) | Offload policies enforced | Other | Technology chosen |
|---|---|---|---|---|---|---|
| ETL Engine Only | Sources:<br><br>• Database Type A<br>• Database Type B<br>• Database Type C<br><br>Targets:<br>• Database Type B<br>• Database Type D | One time snapshot<br><br>Periodic | Predicates UI<br><br>Sampling UI | Per table record limits - yes<br><br>Job parallelism - yes<br><br>Warehouse update - High/Medium/Low (HML) transaction volume<br><br>Availability and Scheduling | Scheduling UI shown if periodic<br><br>If policy indicates Generate Only, user should not have UI option to generate and execute. | ETL Engine templates |

| Installed components | Source and target databases | Update frequency | User specified limits (filtering) | Offload policies enforced | Other | Technology chosen |
|---|---|---|---|---|---|---|
| Replication Engine Only | Sources:<br><br>• Database Type A<br>• Database Type B<br>• Database Type C<br>  ○ Error thrown<br><br>Targets:<br>• Database Type B<br>• Database Type D | One time snapshot (refresh)<br><br>Periodic (mirroring with shutdown)<br><br>Continuous (mirroring) | Predicates UI<br><br>Sampling UI | Per table record limits - issue a warning that this policy is ignored<br><br>Job parallelism - N/A<br><br>Warehouse update - HML transaction volume<br><br>Availability and Scheduling | Scheduling UI shown if periodic<br><br>If policy indicates Generate Only, user should not have UI option to generate and execute. | Replication Engine Subscription |

| Installed components | Source and target databases | Update frequency | User specified limits (filtering) | Offload policies enforced | Other | Technology chosen |
|---|---|---|---|---|---|---|
| ETL Engine and Replication Engine | Source:<br>• Database Type C<br>Targets:<br>• Database Type B<br>• Database Type D | One time snapshot<br><br>Periodic | Predicates UI<br><br>Sampling UI | Per table record limits - yes<br>Job parallelism - yes<br>Warehouse update - High/Medium (HM) transaction volume<br>Availability and Scheduling | Scheduling UI shown if periodic<br><br>If policy indicates Generate Only, user should not have UI option to generate and execute. | ETL Engine templates |
| | Sources:<br>• Database Type A<br>• Database Type B<br><br>Targets:<br>• Database Type B<br>• Database Type D | Continuous | Predicates UI<br><br>Sampling UI | Per table record limits - issue a warning that this policy is ignored<br>Job parallelism - N/A<br>Warehouse update - HML transaction volume<br>Availability and Scheduling - N/A | If policy indicates Generate Only, user should not have UI option to generate and execute. | Replication Engine Subscription |
| | | All other update frequencies | User specifies sampling<br><br>Predicates UI<br><br>Sampling UI | Warehouse update - HM<br>Per table record limits - yes<br>Job parallelism - yes<br>Availability and Scheduling | Scheduling UI shown if periodic<br><br>If policy indicates Generate Only, user should not have UI option to generate and execute. | ETL Engine templates |
| | | | | Warehouse update - Low (L) transaction volume<br>Per table record limits - issue a warning that this policy is ignored<br>Job parallelism - yes<br>Availability and Scheduling | Scheduling UI shown if periodic<br><br>If policy indicates Generate Only, user should not have UI option to generate and execute. | Replication Engine subscriptions (small data size)<br><br>ETL Engine templates (large, medium data sizes) |

INTENT BASED AUTOMATION OF DATA MANAGEMENT OPERATIONS BY A DATA MANAGEMENT ENGINE

FIELD

Embodiments of the invention relate to initiating data management operations in a data management engine.

BACKGROUND

Information management may be described as various processing of data (e.g., moving data, cleansing data, consolidating data, etc.). Information management is designed to provide data stewards, data analysts, or subject matter experts with knowledge through data.

Information management has grown to be a complex and labor intensive task over the years. Reasons for this growth are scale and volume on one hand, but also governance requirements and process complexity on the other hand. A number of techniques have been developed to counter this growth and allow information management users to stay in control of their data.

Different user groups may require different slices of the data and may need them in different representations. Also, users may want a copy of public data in their independent (e.g., local) environments, without the risk of impacting the 'big' system. This entails a data management operation that moves or copies the public data to the independent environment.

SUMMARY

Provided are a method, computer program product, and system for processing a data management request. User intent that defines properties of target data is determined. Policies and constraints for the data management request are determined. An abstract data management request that identifies source data, the target data, and the polices and constraints is created. A technology to use to process the data management request based on the user intent, policies, and constraints is determined.

BRIEF DESCRIPTION OF THE SEVERAL VIEWS OF THE DRAWINGS

Referring now to the drawings in which like reference numbers represent corresponding parts throughout:

FIG. 4 is formed by FIGS. 4A and 4B.

FIG. 5 illustrates a computing architecture for identifying a technology in accordance with certain embodiments.

FIG. 9 illustrates an example decision table in accordance with certain embodiments. FIG. 9 is formed by FIGS. 9A, 9B, and 9C.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
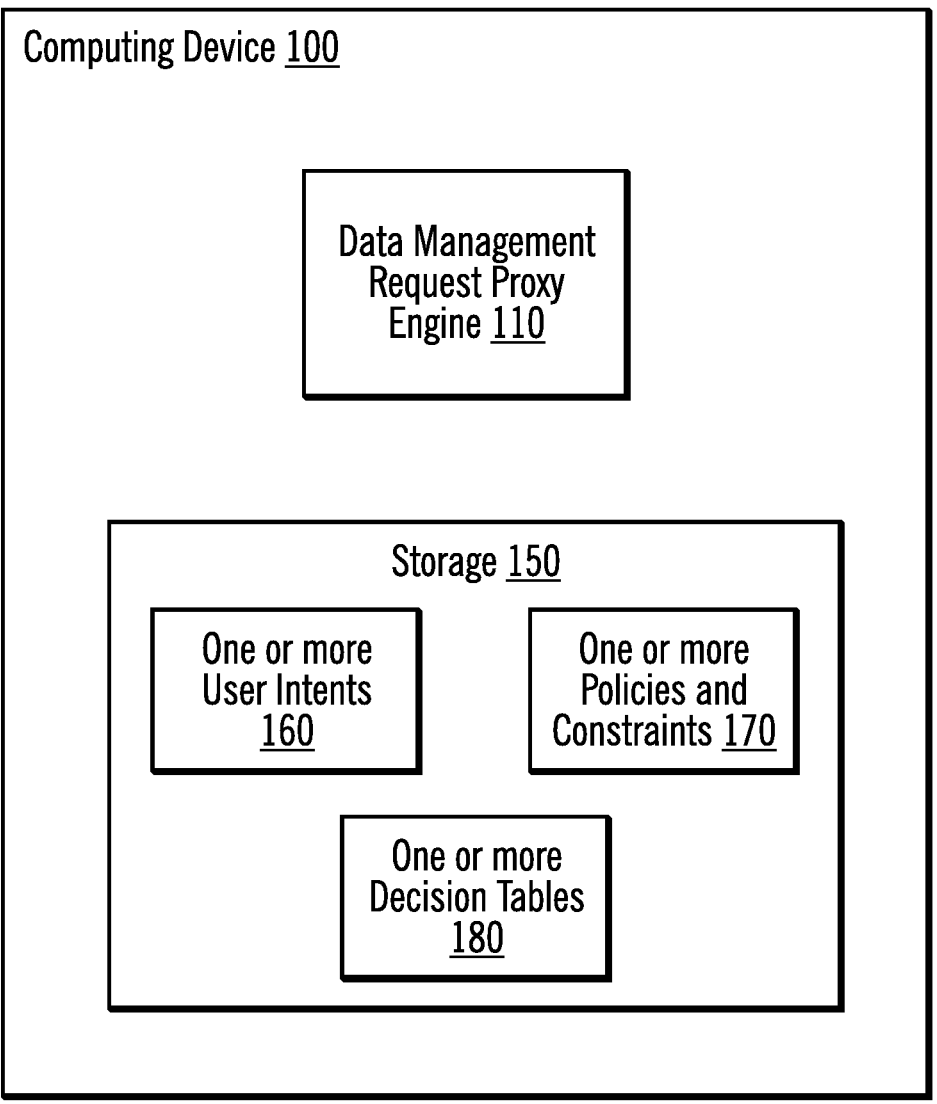
FIG. 1 illustrates a computing architecture in accordance with certain embodiments.

FIG. 1 illustrates a computing architecture in accordance with certain embodiments. The computing device 100 includes a Data Management Request Proxy (DMRP) engine 110. The computing device 100 also includes storage 150. The storage 150 may be persistent or non-persistent (e.g., memory, user input, etc.) or a combination of persistent and non-persistent storage. In certain embodiments, one or more user intents 160 and one or more policies and constraints 170 are stored in non-persistent storage. In certain embodiments, the one or more decision tables 180 are stored in persistent storage.

The user intent 160 may be described as defining properties that a target copy of data should have upon execution of an offload request to create that target copy from a source copy of data. The user intent 160 may be thought of as a description of the result of an offload request. Policies and constraints 170 may be described as providing information on data that is to be processed by the data management operation (e.g., how much data is to be moved, how can that data be accessed, etc.). A decision table 180 may be described as including patterns that may be used to implement the data management request, data characteristics describing storage systems that are available for the data management request, and tooling characteristics of tools that may be used to implement the data management request. A pattern may be described as representing best practices for use of one or more technologies. A pattern may be used to implement the data management request. A pattern describes sequential processing operations. A pattern may also be considered to be a business practice for implementing some task. Examples of patterns include: a) capturing metadata, b) building a system landscape, c) performing data movement, and d) performing operational monitoring.

In certain embodiments, the DMRP engine 110 determines the user intents 160 and the policies and constraints 170 by asking one or more users questions (e.g., via a User Interface (UI)) and recording the answers to the questions. In certain embodiments, the DMRP engine 110 uses the user intents 160, the policies and constraints 170, and the one or more decision tables 180 to identify a technology to be used to implement a data management request.

Figure 2:
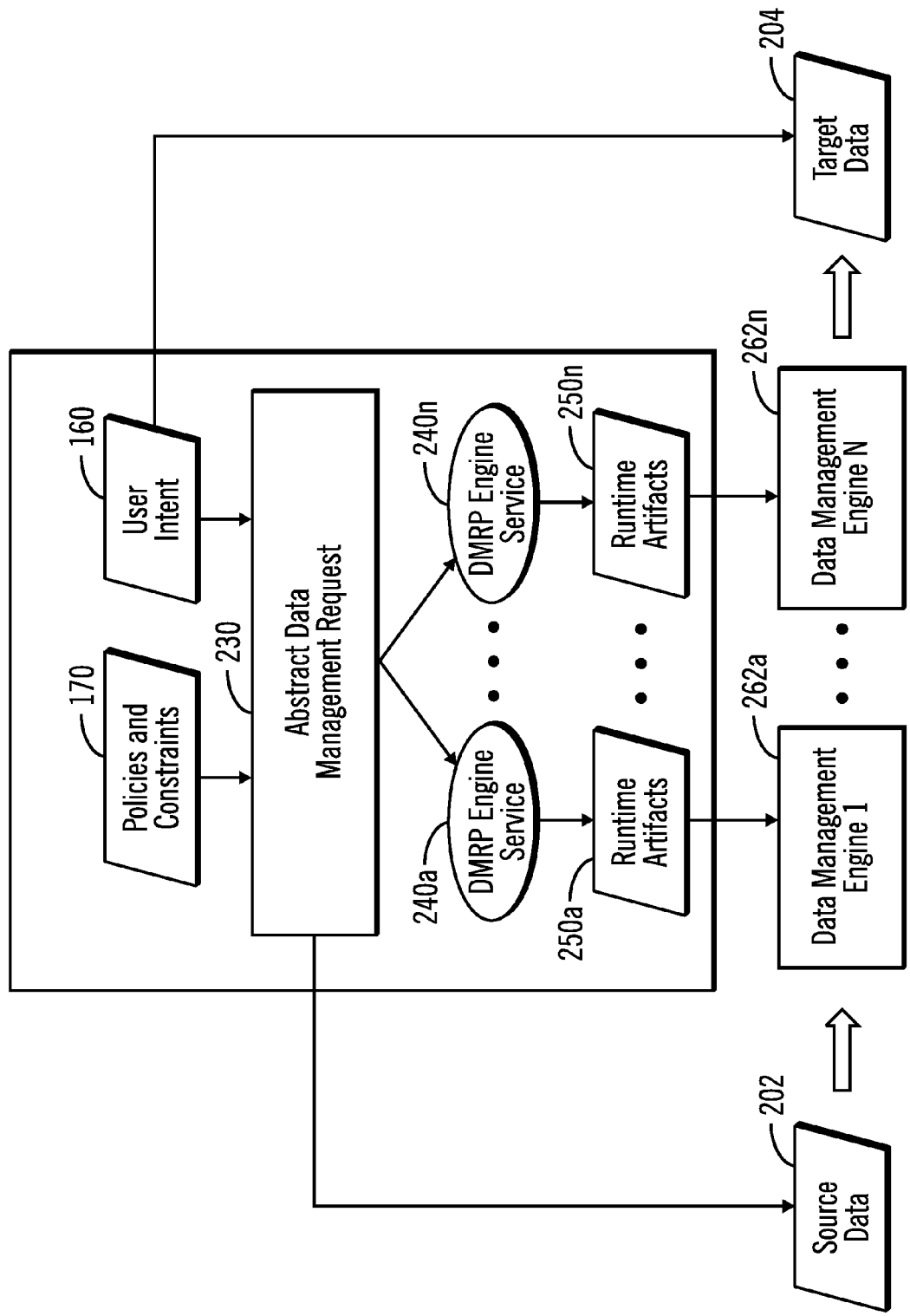
FIG. 2 illustrates a component diagram in accordance with certain embodiments.

FIG. 2 illustrates a component diagram in accordance with certain embodiments. FIG. 2 illustrates components and artifacts related to certain embodiments and depicts dependencies among those components. With reference to FIG. 1 and FIG. 2, the DMRP engine 110 performs a data management operation to move or copy source data 202 to target data 204. The DMRP engine 110 uses the user intent 160 and the policies and constraints 170 to generate an abstract data management request 230.

The abstract data management request 230 may be described as an abstract description of a data management operation. The abstract data management request 230 may contain references to the source data 202, the target data 204, and the policies and constraints 170 used for the data management operation. In certain embodiments, the abstract data management request 230 does not map to a technology or a physical data management operation.

The abstract data management request 230 may be routed to one or many DMRP engine services 240a . . . 240n. Each of the DMRP engine services 240a . . . 240n may generate runtime artifacts 250a . . . 250n. A runtime artifact 250a . . . 250n may be described as a set of instructions that can be interpreted and executed by the corresponding data management engine 262a . . . 262n. Each set of one or more runtime artifacts 250a . . . 250n may be routed to a corresponding data management engine 262a . . . 262n. The runtime artifacts 250a . . . 250n may be described as concrete data management requests in the syntax and with the correct semantic for the corresponding data management engine 262a . . . 262n.

The DMRP engine 110 may be described as the system that facilitates the execution of multiple instances of the DMRP engine services 240a . . . 240n. The DMRP engine services 240a . . . 240n may be executed and managed by the DMRP engine 110.

In certain embodiments, each data management engine 262a . . . 262n implements a particular technology. In such embodiments, each technology of multiple technologies may have an associated DMRP engine service 240a . . . 240n ("service") that creates runtime artifacts 250a . . . 250n that are used by that technology.

A data management engine 262a . . . 262n may be described as an engine capable of executing a data management operation. The data management engine 262a . . . 262n may receive a runtime artifact 250a . . . 250n with physical instructions on how to process (e.g., move) data. The data management engine 262a . . . 262n may be managed and monitored by an administrator.

In certain embodiments, the DMRP engine 110 binds the abstract data management request 230 to one or many user intents 160 and one or many data management engines 262a . . . 262n.

A DMRP engine service 240a . . . 240n may create the data management artifacts on behalf of the DMRP engine 110 for the chosen data management engine. Multiple DMRP engine services may be used for a single abstract data management request to address different requirements specified in the user intent 160.

The DMRP engine 110 may initiate data management operations in an information management environment. In particular, the DMRP 110 provides a user with a technique that creates a data copy without regard for the underlying software, runtime artifact, or process at play. The DMRP 110 may offload data from a source into independent user copies by leveraging various technologies, including: 1) metadata that has been captured for the data as a means to manage complexity and depict data dependencies; 2) blueprints that exist to visualize the information management landscape and depict system dependencies; 3) data management operations that have been built with different properties to address different data management requirements (including variety, velocity, volume); and 4) operational monitoring for each data management operation to assert its correctness and completeness and to respond to problems.

Figure 3:
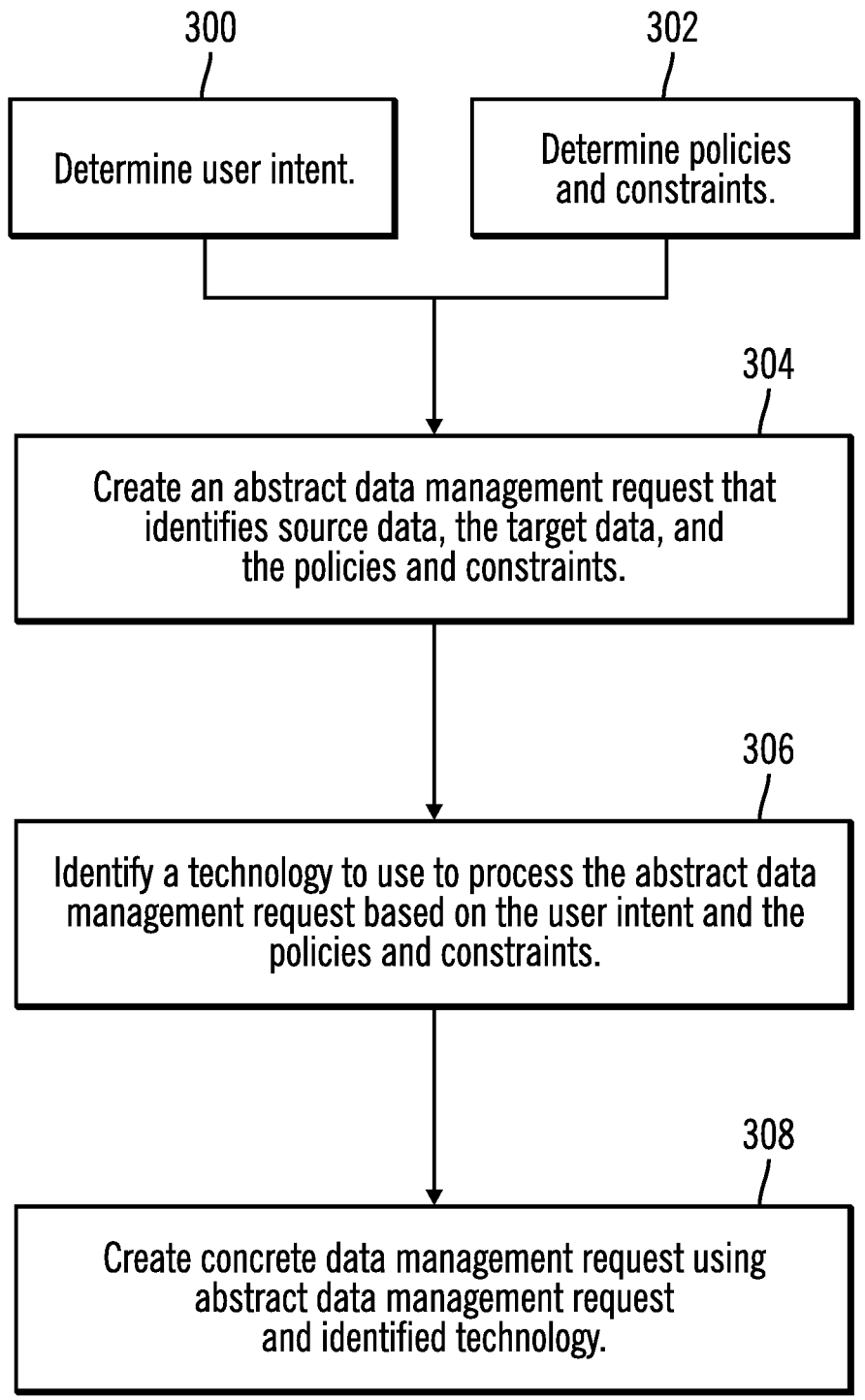
FIG. 3 illustrates, in a flow diagram, operations to generate a concrete data management request in accordance with certain embodiments.

FIG. 3 illustrates, in a flow diagram, operations to generate a concrete data management request in accordance with certain embodiments. With reference to FIG. 1 and FIG. 3, the DMRP engine 110 determines the user intent 160 (block 300) and determines the policies and constraints 170 (block 302). In block 304, the DMRP engine 110 creates an abstract data management request that identifies source data, the target data, and the policies and constraints 170. In block 306, the DMRP engine 110 identifies a technology to use to process the abstract data management request based on the user intent 160 and policies and constraints 170. In certain embodiments, the DMRP engine 110 also uses a decision table 180 (which includes patterns tooling capabilities and features), along with the user intent 160 and policies and constraints 170, to identify the technology. In block 308, the DMRP engine 110 creates a concrete data management request using the abstract data management request and the identified technology. The concrete data management request may be executed to perform a data management operation. Thus, a technology decision, user intent 160, and policies and constraints 170 are used as input to form a concrete data management request.

In certain embodiments, the concrete data management request may be to move data, copy data, etc. (e.g. using Structured Query Language (SQL), changed data capture, complex Extract Transform Load (ETL), Map/Reduce, data generation, archiving, other analytic data management tooling, etc.).

Thus, the DMRP engine 110 introduces a level of abstraction that separates the creation of the concrete data management request that is to be executed from the user intent 160 and the policies and constraints 170 of the given data management system. User intent 160 and the environment operated in may change. The concrete data management request may be tied to the technology used, and the DMRP engine 110 recognizes such a single dependency. The DMRP engine 110 may determine the technology based on the user intent 160 and the policies and constraints 170. Thus, while there may be a single abstract data management request, the DMRP engine 110 may construct multiple concrete data management requests. The DMRP engine 110 is able to construct the concrete data management requests because of the de-coupling of the user intent 160 and the policies and constraints 170 from the technology decision. This is possible due to the abstraction of the data management request.

Figure 4A:
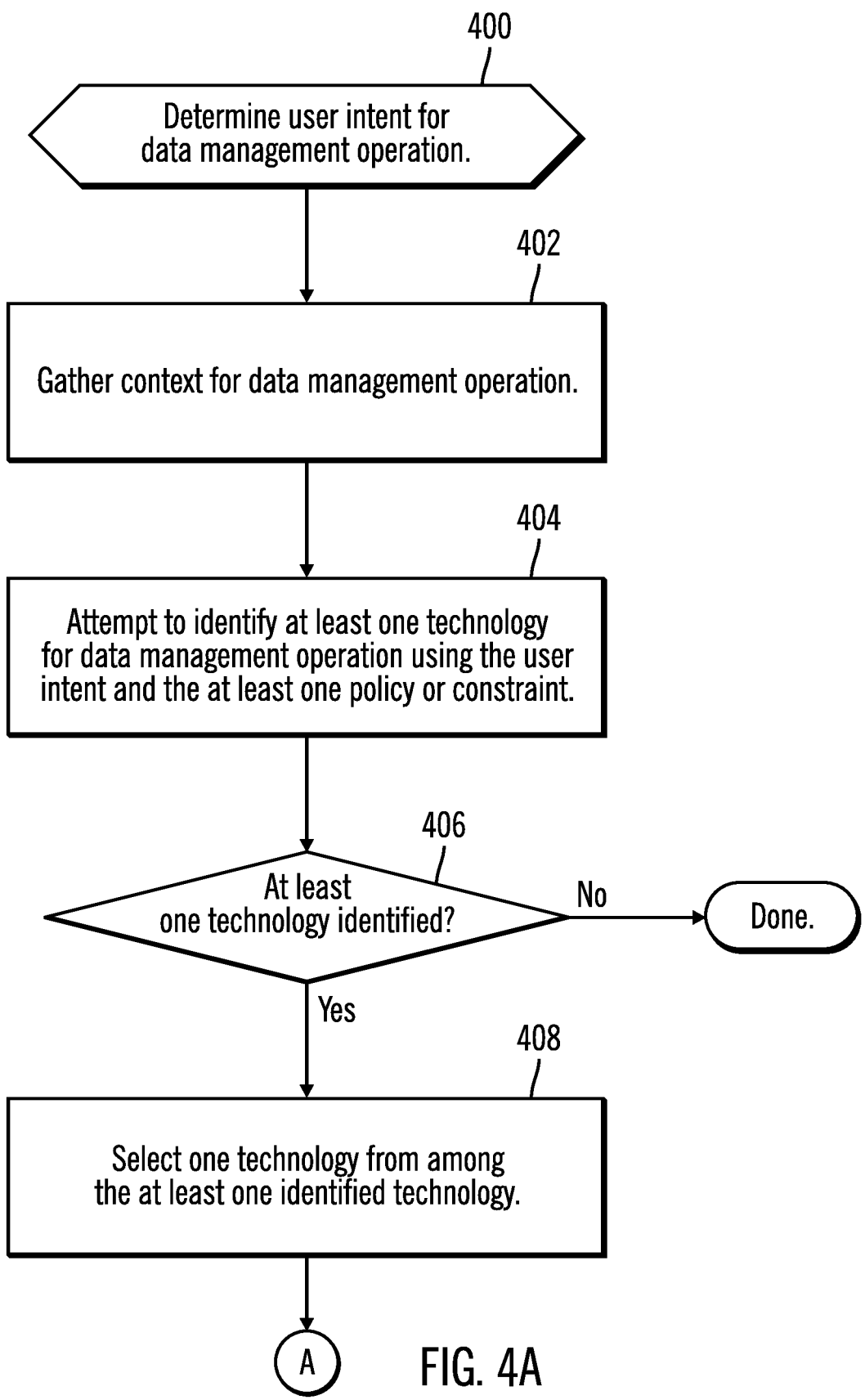
FIG. 4 illustrates, in a flow diagram, operations for data management in accordance with certain embodiments.
Figure 4B:
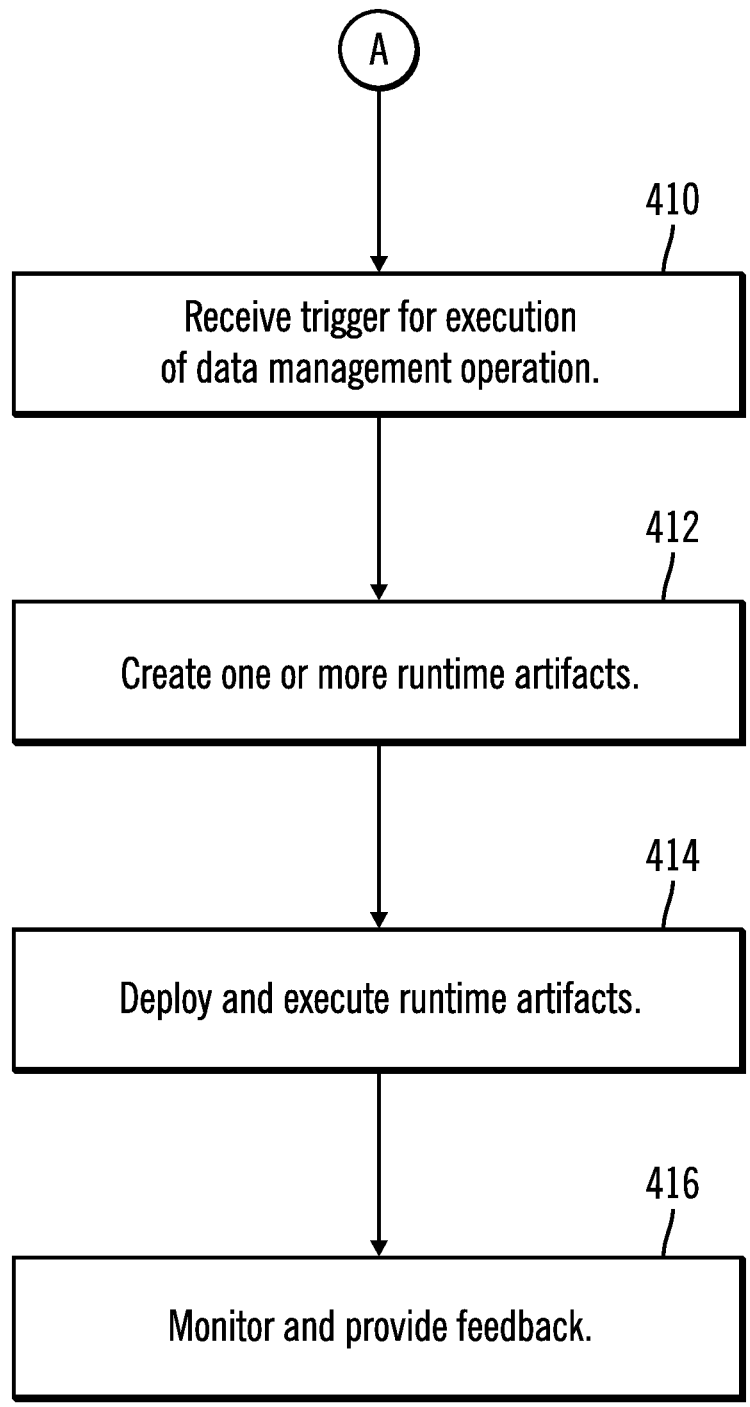

FIG. 4 illustrates, in a flow diagram, operations for data management in accordance with certain embodiments. FIG. 4 is formed by FIGS. 4A and 4B. Control begins at block 400 with the DMRP engine 110 determining user intent 160 for a data management operation. The user intent 160 may be described as a starting point of the data management operation. The user intent 160 may describe the desired properties of the data management, including but not limited to:

the target location
    the data to be made available at the target
    the transformations to be applied on the data
    the access constraints on the target
    the availability of the data at the target
    the lifecycle requirements of the data at the target the update requirements between the source and the data at the target In various embodiments, the user intent 160 may be available as input to the DMRP engine 110 or may be collected from the user by the DMRP engine 110.

In block 402, the DMRP engine 110 gathers context for the data management operation. This may include the DMRP engine 110 identifying at least one policy or constraint for the data management operation. With a given user intent 160, the data management operation may receive a set of inputs that are used for the physical data management operation. These inputs may include, but are not limited to:

the technologies available for the data management operation the connection information for each data management engine the connection information to the source and target data stores any constraints on the data management operation itself (e.g. don't utilize more than x % of the system, execute only during certain times of the day, etc.)

any templates or pre-compiled runtime artifacts needed to perform the physical data management operation upon request The DMRP engine 110 may gather the context prior to the technology decision to find a common denominator across all technologies available and build the abstract data management request before making the technology decision. Thus, a single abstract data management request may be re-used for multiple data management operations across different technologies. This separates the preparation from the execution and can, therefore, be performed by different types of users (e.g., administrator and end-user). The end-user may leverage different technologies (e.g., defined and constrained by an administrator. This provides a simple and repeatable pattern for the end-user. In particular, an administrator may set up defaults for the information that may be gathered via interviewing the user through a User Interface (UI).

In block 404, the DMRP engine 110 attempts to identify at least one technology for the data management operation using the user intent 160 and the at least one policy or constraint 170. In block 406, the DMRP engine 110 determines whether at least one technology has been identified. If so, processing continues to block 408, otherwise, processing is done. In block 408, the DMRP engine 110 selects one technology from among the at least one identified technology. That is, multiple technologies may be identified, and various factors are used to select one of these technologies. From block 408 (FIG. 4A), processing continues to block 410 (FIG. 4B).

Thus, the technology decision may be made based on the user intent 160 and the context. If no technology is available to meet the user intent 160, the DMRP engine 110 may terminate, and this may means that the user intent 160 has to change prior to launch or the system has to be extended. If a single technology is available to meet the user intent 160, the technology may be chosen. If more than one technology is available to meet the user intent 160, a deterministic decision may be made.

In block 410, the DMRP engine 110 receives a trigger for execution of the data management operation. At this point, input is available to create, deploy, and execute the runtime artifacts.

In block 412, the DMRP engine 110 creates one or more runtime artifacts. The runtime artifacts may be the specific models, programs, scripts, or configurations used to execute the data management operation with the selected technology. The artifacts may be constructed in the syntax and with the semantic for the given data management engine.

In block 414, the DMRP engine 110 deploys and executes the runtime artifacts. Before the actual execution of the data management operation, the runtime artifacts may be deployed and potentially compiled as part of the deployment process. A set of parameters may be passed to the deployed artifacts as part of the execution.

In block 416, the DMRP engine 110 monitors and provides feedback. With embodiments, there is a feedback loop between the data management engines and the DMRP engine 110 for both engines to interact. In different embodiments, there may be different implementations regarding if and how status changes and execution errors are processed. For example, they can either be used as part of a feedback loop to remediate the problem or be monitored and logged for the user to respond.

Thus, the execution may be based on the user intent 160 and constrained by a context to be collected as a prerequisite. The technology decision may be made based on the user intent 160 and the context available at this point. The consequence of the data management request may be a sequence of operations consisting of the creation of runtime artifacts, the deployment and execution of the runtime artifacts, and the monitoring and feedback loop.

In certain embodiments, the user intent 160 may be determined with a software tool. The tool is initially loaded with metadata and information available about the source and target data stores. The software tool then uses a set of wizards and queries to ask the user specific questions and to construct the user intent 160 based on the answers to those questions. In certain embodiments, the software tool may produce an eXtensible Markup Language (XML) document to pass the user intent 160 to the DMRP engine 110.

The context for the data management operation may be constructed using a combination of techniques, such as: a set of default values for the parameters; system queries to check for the available offloading technologies; and user queries to allow the user to overwrite the settings.

Embodiments achieve a balance between flexibility and ease-of-use. In one case, the user may accept the default values and the automated decisions and proceed to the execution without the need for intervention. In another case, the user may overwrite the default settings with a different set of values.

In certain embodiments, the trigger for execution of the data management request may be a one-click operation (e.g., a single mouse click) to trigger the execution of the data management operation. In such embodiments, the trigger to execute the data management operation may be implemented with a button in a user dialog. In various embodiments, other implementations are feasible (e.g., where the user merely initiates the execution of some backend processes).

The creation of the runtime artifacts may be delegated to specific instances of the DMRP engine service. In certain embodiments, every instance of the DMRP engine service knows how to create the right artifact for the right version of a given data management engine and serves as a mediator between the DMRP engine service and the underlying data management engine.

As for the creation of the runtime artifacts, the deployment and execution may be triggered by the DMRP engine service instance available for the specific data management engine. This DMRP engine service instance knows whether a runtime artifact has to be compiled prior to deployment and knows how to compile and how to deploy the runtime artifacts. The DMRP engine service also knows how to trigger the execution and pass the parameters for the execution. The execution may be triggered by the DMRP engine service, but may be managed by the data management engine. The DMRP engine service instance may interact with the data management engine and respond to exceptions and status changes from the data management engine. Thus, the DMRP engine 110 may provide a technique for interviewing a user who answers a set of questions that allows the selection of the source data management activities (e.g., selection of software) that are required. The DMRP engine 110 may utilize pattern matching to deduce which software to use. Based on the user's responses, the DMRP engine 110 understands the different patterns that may be used to perform a data management activity (1) based on the configuration of the environment and the tooling capabilities to perform the activities, and (2) based on an understanding of policies and constraints 170 that the runtime artifacts should be created under. Further, the DMRP engine 110 may provide enforcement of the data management activity based on the policies and constraints 170.

Identifying a Technology

In certain embodiments, the DMRP engine 110 provides automated data management using patterns, intents, and policies, along with tooling capabilities and features. The DMRP engine 110 may reduce the source data management cost by automation for the user. In particular, the DMRP engine 110 may automatically manage the source data system for the user. Thus, in certain embodiments, the DMRP engine 110 provides a technique in which the activities surrounding the data management operation are automated and hidden from the user. The DMRP engine 110 may do this by utilizing general patterns associated with the data management operation, policies that define the assumptions and constraints that the data management operation works under, as well as, programmatic knowledge of the data management tools. This information allows the DMRP engine 110 to automatically generate and govern the data management artifacts that effect the data management operation.

In certain embodiments, the DMRP engine 110 shields users from the complexities of the source system, which may reduce the skill set of the user trying to perform the activity and may remove "human" aspects of generating the appropriate audit trails. The DMRP engine 110 may allow the user to identify what activity the user wants to accomplish and may, for example:

1. determine the best/optimal pattern to accomplish the task
 2. determine the best/tooling available to accomplish the task
 3. determine the constraints and policies imposed by the administrator to help determine the best pattern and tooling
 4. generate the appropriate artifacts that will accomplish the intent of the user—an individual or orchestrated set of activities
 5. manage and govern the execution of the activities
 6. generate an audit trail of the execution of the activities In certain embodiments, a user may be interviewed through a set of questions (e.g., by a software tool), and, from the information extracted, along with the environment configuration information, the DMRP engine 110 may apply a pattern matching technique to automatically deduce the source data management activities required. In certain embodiments, based on the user's responses, the DMRP engine 110 understands the different patterns that are to be used to best perform an activity; understands the configuration of the environment, the tooling installed, and the tooling capabilities to pick the best tool to perform the activity; understands the policies and constraints 170 that the runtime artifacts are to be created under; and provides enforcement of the data management operation based on the policies and constraints 170.

The DMRP engine 110 may automate and enforce data management operations such that the DMRP engine 110 may be driven by less skilled individuals and may manage the environment, freeing up highly skilled individuals to focus on the development of new systems or applications and reducing costs for customers.

In certain embodiments, the DMRP engine 110 reduces the level of skills required by the user wanting to execute the original task as that knowledge is built into the system itself, allowing the system to be used by less skilled personnel. The DMRP engine 110 may free up expensive engineering resources that are otherwise tied up developing and managing these standard data management tasks. In certain embodiments, the DMRP engine 110 provides for a framework where the execution, enforcement, and auditing is managed by the DMRP engine 110 and not by individuals. The DMRP engine 110 may reduce the time to develop new applications based on the data management operation (e.g. creation of sandboxes, test data sets, etc.) since the DMRP engine 110 reduces the amount of user activity in the process.

FIG. 5 illustrates a computing architecture for identifying a technology in accordance with certain embodiments. In certain embodiments, the DMRP engine 110 is configured with available patterns 510 that may be used to implement the data management request data characteristics 512 (e.g., characteristics of storage systems that may be used by the data management request), and tooling characteristics 514 (e.g., characteristics of tools that may be used to implement the data management request). The DMRP engine 110 gathers information about the users' needs 520, available systems 522, and policies and constraints 524. Then, the DMRP engine 110 may generate artifacts, enforce (i.e., manage or execute) the data management operation, and track (i.e., monitor or audit) the data management operation.

Figure 6:
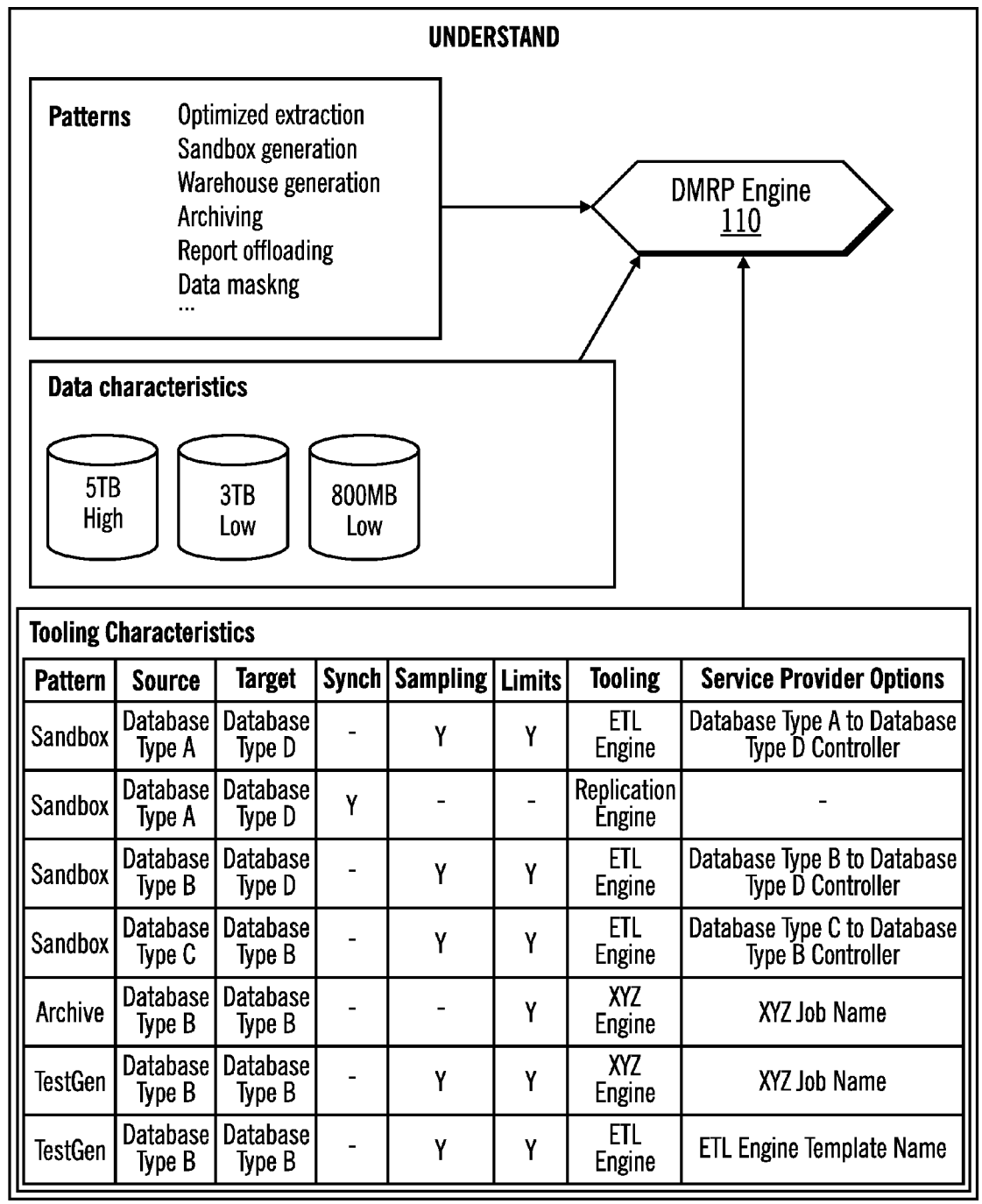
FIG. 6 illustrates a computing architecture for obtaining information about an environment in accordance with certain embodiments.

FIG. 6 illustrates a computing architecture for obtaining information about an environment in accordance with certain embodiments. For example, the DMRP engine 110 may query one or more catalogs to obtain an understanding of the environment in which the data management operation is to be executed.

The DMRP engine 110 builds an understanding of the pattern to be used, the data systems, and the tooling characteristics. For example, the DMRP engine 110 queries a catalog of patterns and pattern characteristics to identify, for example:

What are best practices of pattern X?
 What are policies that need to be enforced?
 Where would data management activities best be executed (e.g. closer to the source data, or close to the target data)?
 . . .

In addition, the DMRP engine 110 may query a catalog of what data systems are available to identify, for example:

How is the data accessed by a particular system?
 How is the data classified by a particular system?
 How much data is being managed by a particular system and what is the capacity of the particular system?
 What is the turnover volume?
 . . .

Moreover, the DMRP engine 110 may query a catalog of tooling to identify, for example:

What are characteristics (e.g. performance versus selectability, etc.) of the tools?
 What patterns do the tools support?
 What options are supported by the tools?

What systems do the tools run on?
Types of data do the tools supports?
. . .

Figure 7:
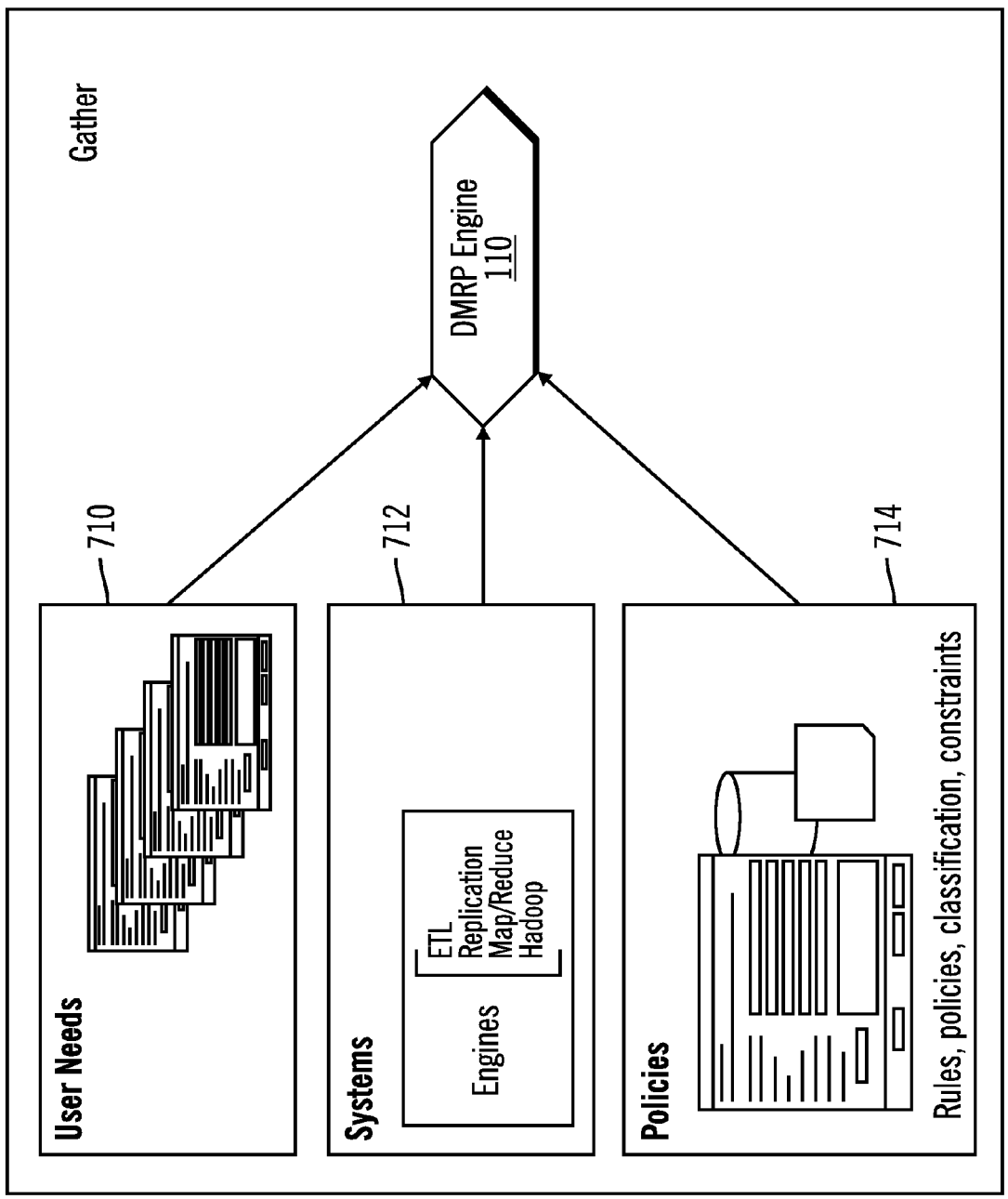
FIG. 7 illustrates information gathering in accordance with certain embodiments.

FIG. 7 illustrates information gathering in accordance with certain embodiments. For example, the DMRP engine 110 may gather information about user needs 710, about policies and constraints (e.g., from policy and constraint stores 712), and about available systems (e.g., information on tooling) to determine what data management activities may be supported on the customer's environment.

With information gathered, the DMRP engine 110 understands user intent 160 of the data management operation and the boundaries that the data management operation will need to execute in. The DMRP engine 110 may provide a User Interface (UI) to ask questions to determine the users' intent, such as the following questions:

Do you want to create a sandbox for development of new reports or analytics?
Do you want to offload reports?
Do you want to archive data?
Do you want to a want to generate test data?
Do you want to gain access to analyzed data?
. . .

The DMRP engine 110 may identify what tools are available on the system, such as the following tools:
Data management tools
Archiving tools
Data masking and privacy tools
Analytic data generation tools
. . .

The DMRP engine 110 may identify policies and constraints 170 that are to be enforced, by obtaining answers to questions such as the following:
How much data can be moved?
When is data available?
How is the individual's data managed?
What procedures are in place for accessing the individual's data?
. . .

Figure 8:
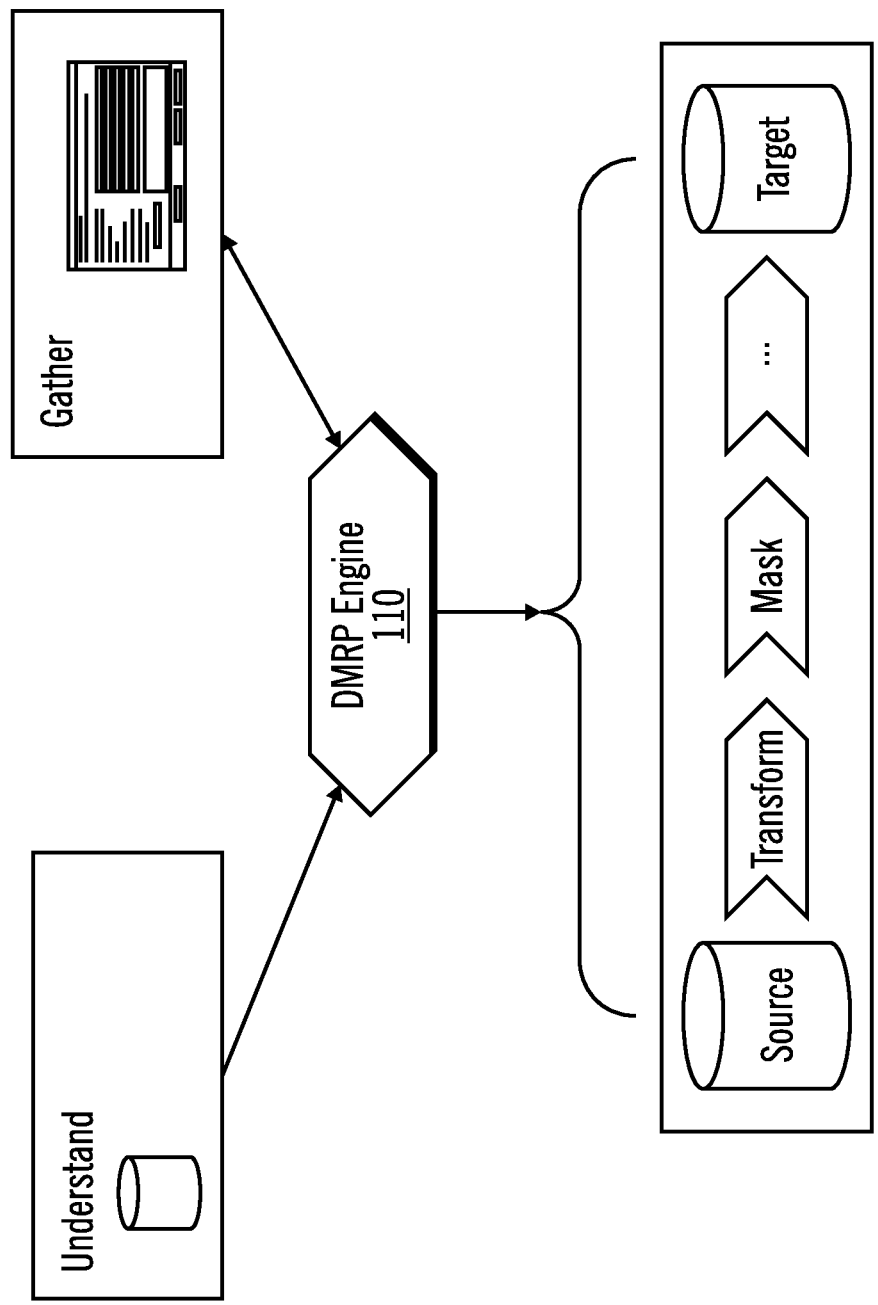
FIG. 8 illustrates generating, managing, and monitoring a data management operation in accordance with certain embodiment.

FIG. 8 illustrates generating, managing, and monitoring a data management operation in accordance with certain embodiment. For example, the DMRP engine 110 may utilize the gathered information to generate and govern (manage and monitor) the data management operation.

In particular, the DMRP engine 110 may utilize the gathered information to generate the artifacts that perform the data management operation, enforce and govern the execution of the artifacts per policies and constraints 170, and then manage the audit trail of the execution of the data management operation.

With reference to artifacts generation, the DMRP engine 110 may generate the artifacts to optimally accomplish the user's intent and creates artifacts to enforce the policies and constraints 170 (e.g., based on data characteristics, mask data before moving, etc.). The DMRP engine 110 may generate artifacts that span multiple tools.

With reference to executing the artifact, the DMRP engine 110 may locate the system of execution based on the capacity of data systems to be accessed and enforce the policies and constraints 170 (e.g., run after midnight, limit data movement to 1TB, etc.).

With reference to auditing, the DMRP engine 110 may track the execution of the artifact and relate the execution artifacts to the data systems accessed and the tools used.

The DMRP engine 110 may provide User Interfaces (UIs) to understand the intent of the user and what the user is trying to accomplish. These UIs may involve direct interaction with the user or may be different software that is installed and configured on the system the user is interacting with.

In certain embodiments, user interaction may be accomplished via a set of UI wizards that change based upon the answers the user provides and based upon the user's interaction with the system. In certain embodiments, the UI wizard is populated and dynamically changes based on the DMRP engine 110 understanding, for example:

1. What is available on the host system and the properties of the host system, such as the following:
   Data management engines 262a . . . 262n installed
   Data management sources available, access, capacity, mappings, etc.
   Metadata about what data is available to the system, connectivity, authorizations, etc.
2. Patterns supported by each data management engine 262a . . . 262n, as well as, features, functions, and source support.
3. Dynamically understanding the data systems being accessed based on factors such as:
   Key features, such as specificity versus performance versus scalability, etc.
   Size, capacity, and resource utilization from data management engines 262a . . . 262n and data systems
4. The policies, constraints, classification, and rules that are applied
5. Gathering user choices to fully understand the intent of the data management activity the user wants to accomplish, by obtaining information, such as:
   How the user plans to use the data
   What data the user wants and where the user wants the data to go
   How current does the user need the data to be and how to customize the data for the user's needs After the user has specified enough information for the DMRP engine 110 to determine the user's intent, the DMRP engine 110 may utilize deduction to select and apply the appropriate pattern that is determined as appropriate to address the user's intent and may determine the best tooling to enable the data management request. In certain embodiments, the DMRP engine 110 may use a dynamic logic tree that is programmatically navigated based upon the pattern, user intent 160, policies and constraints 170, and what capabilities the tooling provides.

After the DMRP engine 110 has determined the best execution plan and tooling, the DMRP engine 110 may generate the specific artifacts that are needed to execute the data management request in a manner that enforces the policies, constraints and rules that were identified, enforce the execution of the artifact (or set of artifacts) that the DMRP engine 110 generated in the tooling chosen, monitor the progress of the data management activity, and track the progress of the data management activity so that the entire process is auditable and traceable.

In certain embodiments, a decision table 180 includes patterns that may be used to implement the data management request, data characteristics describing storage systems that are available for the data management request, and tooling characteristics of tools that may be used to implement the data management request.

FIG. 9 illustrates an example decision table 900 in accordance with certain embodiments. FIG. 9 is formed by FIGS. 9A, 9B, and 9C. The example decision table 900 has rows 900, 910, 920. The example decision table 900 is based upon features, functions, and support of the accessible tools. The example decision table 900 may be walked programmatically to choose the best technology to accomplish the intent of the user. For example, if only an ETL engine is available, then row 900 (FIG. 9A) may be used to determine a technology; if only a replication engine is available, then row 910 (FIG. 9B) may be used to determine the technology; and, if both the ETL engine and the replication engine are available, then, row 920 (FIG. 9C) may be used to determine the technology. The example decision table 900 may include a column for installed components (e.g., ETL engine and/or replication engine); a column for source and target database types; a column for update frequency requirements that determines how frequently the target should be updated; a column for other user specified limits that may be provided in the form of predicates (e.g., where age >35) or with statistical samples (e.g., 10% of the records only); a column listing the offload policies to be enforced (e.g., record limits per table, parallel job execution, etc.) when offloading records from the source database to the target database; a column for other information that may be stored in the example decision table; and a column for the technology to be selected.

For example, with reference to FIG. 9C, if both the ETL engine and replication engine are available, the source database is of type C, the target database is either of type B or type D, the update frequency is periodic, the user specified limits are provided with a predicates UI or a sampling UI, the offload policies desired by the user are consistent with the offload policies listed in row 920, then the technology selected is ETL engine templates.

Thus, in certain embodiments, the DMRP engine 110 automates data management using patterns, user intent 160, and policies and constraints 170, along with tooling capabilities and features. In certain embodiments, the DMRP engine 110 may use user intent 160 to determine data management activity. In certain embodiments, the DMRP engine 110 may use data management patterns to determine data management process. In certain embodiments, the DMRP engine 110 may use policies and constraints 170 to place boundaries on the data management process. In certain embodiments, the DMRP engine 110 may use tooling characteristics to determine the best implementation of data management operations. In certain embodiments, the DMRP engine 110 may enforce data management operations to adhere to policies and constraints 170. In certain embodiments, the DMRP engine 110 may track data management operations for auditing.

Cloud Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
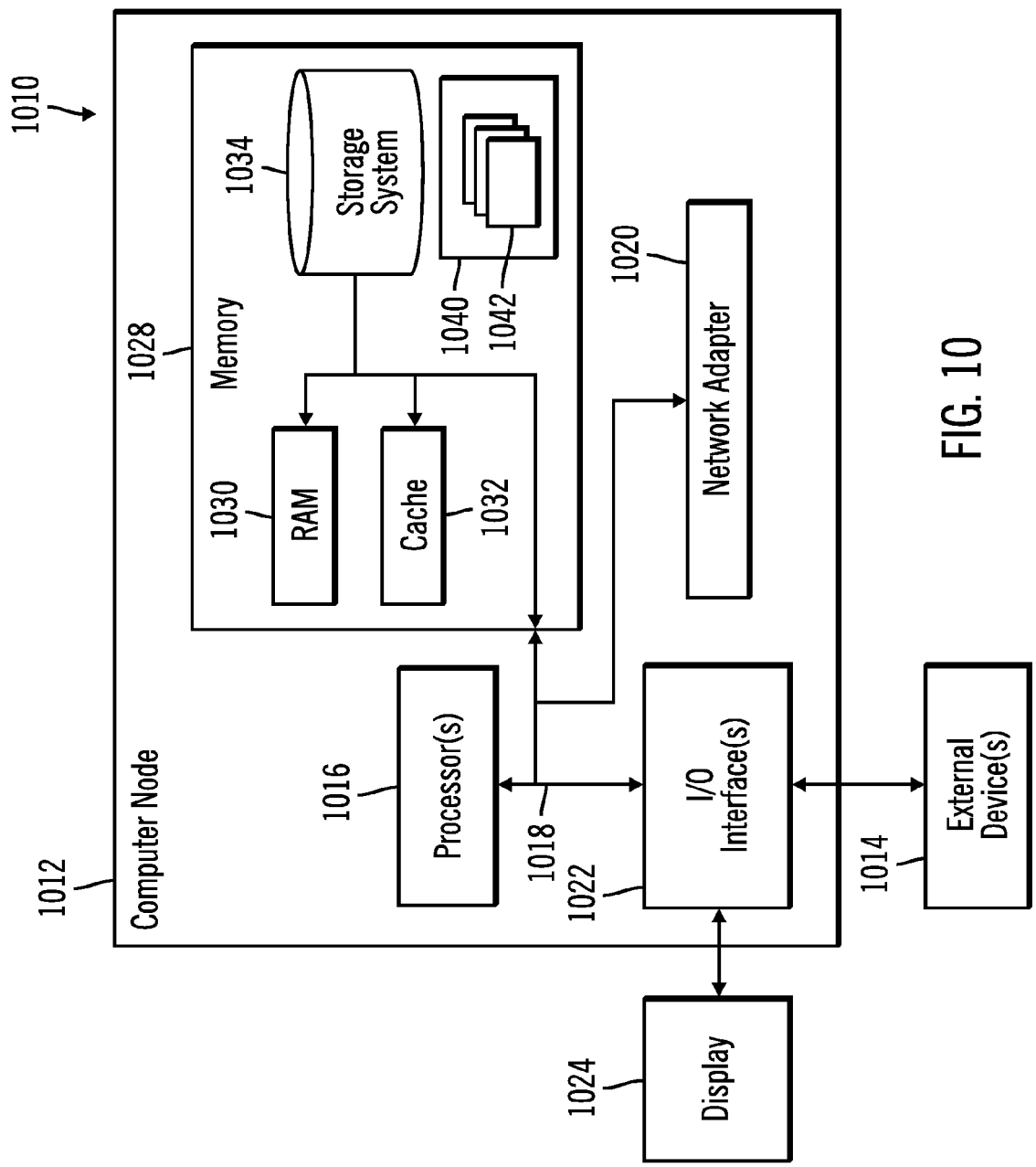
FIG. 10 depicts a cloud computing node in accordance with certain embodiments.

Referring now to FIG. 10, a schematic of an example of a cloud computing node is shown. Cloud computing node 1010 is only one example of a suitable cloud computing node and is not intended to suggest any limitation as to the scope of use or functionality of embodiments of the invention described herein. Regardless, cloud computing node 1010 is capable of being implemented and/or performing any of the functionality set forth hereinabove.

In cloud computing node 1010 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in cloud computing node 1010 is shown in the form of a general-purpose computing device. The components of computer system/server 1012 may include, but are not limited to, one or more processors 1016 or processing units, a system memory 128, and a bus 1018 that couples various system components including system memory 128 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1012 typically includes a variety of computer system readable media. Such media may be any available media that is accessible by computer system/server 1012, and it includes both volatile and non-volatile media, removable and non-removable media.

System memory 128 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 128 may include at least one program product having a set (e.g., at least one) of program modules that are configured to carry out the functions of embodiments of the invention.

Program/utility 1040, having a set (at least one) of program modules 1042, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

Figure 11:
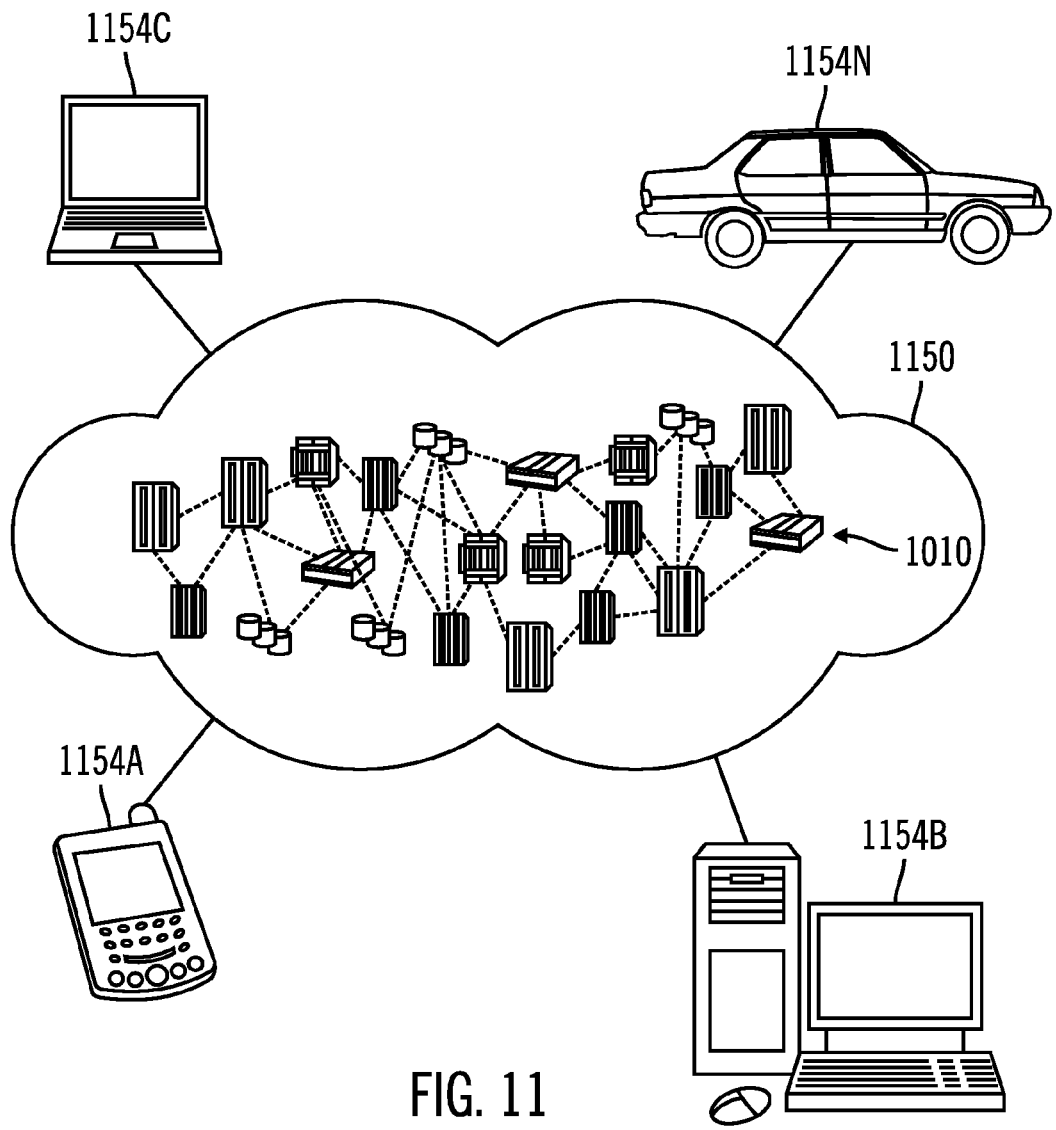
FIG. 11 depicts a cloud computing environment in accordance with certain embodiments.

Referring now to FIG. 11, illustrative cloud computing environment 1150 is depicted. As shown, cloud computing environment 1150 comprises one or more cloud computing nodes 1010 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1010 and cloud computing environment 1150 can communicate with any type of computerized device over any type of network and/or network addressable connection (e.g., using a web browser).

Figure 12:
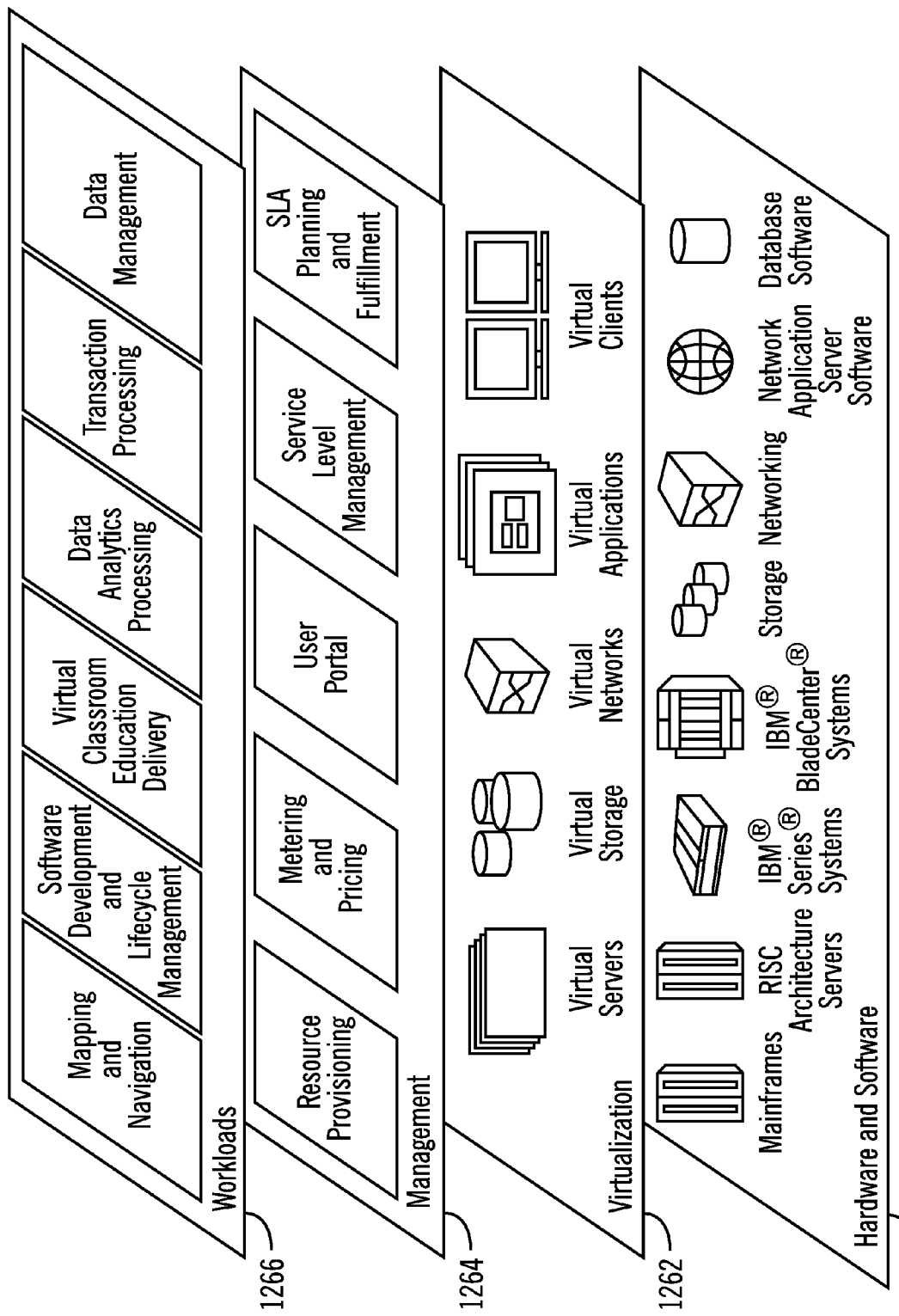
FIG. 12 depicts abstraction model layers in accordance with certain embodiments.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1262 provides an abstraction layer from which the following examples of virtual entities may be provided: virtual servers; virtual storage; virtual networks, including virtual private networks; virtual applications and operating systems; and virtual clients.

In one example, management layer 1264 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1266 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data management.

Thus, in certain embodiments, software or a program, implementing data management in accordance with embodiments described herein, is provided as a service in a cloud environment.

In certain embodiments, the computing device 100 may implement the architecture of computing node 1010. In certain embodiments, the computing device 100 is part of a cloud environment. In certain alternative embodiments, the computing device 100 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3 ands 4 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 13:
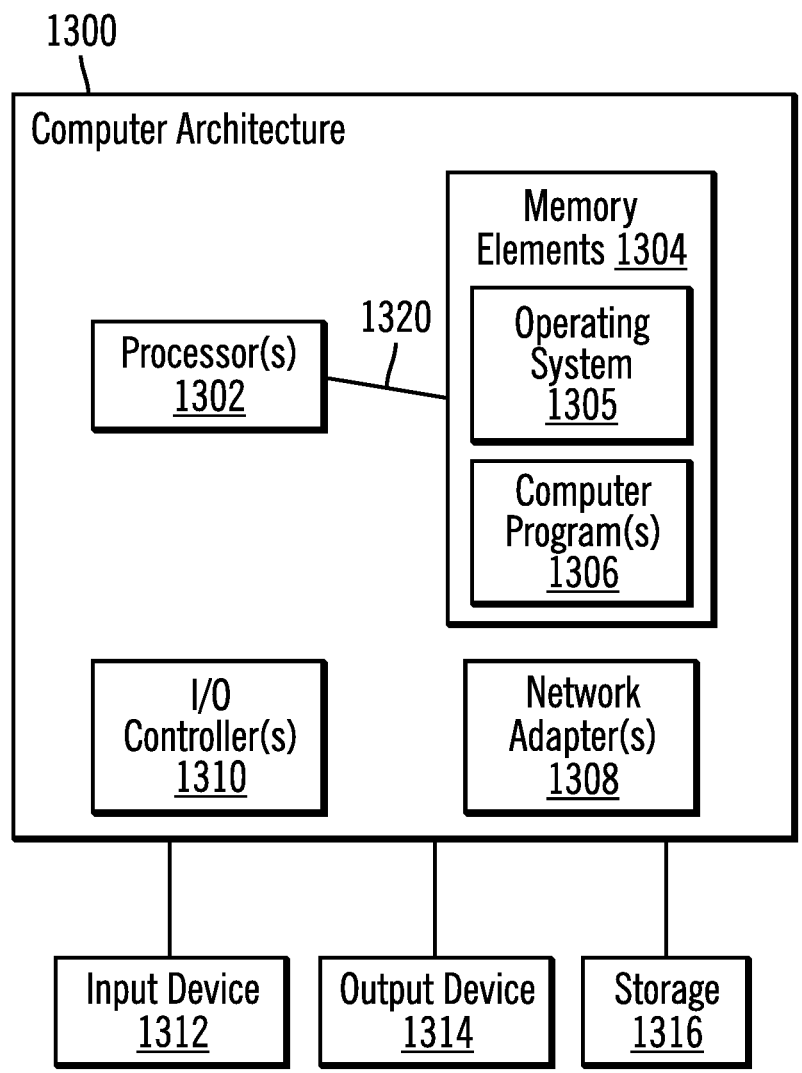
FIG. 13 illustrates, in a block diagram, a computer architecture that may be used in accordance with certain embodiments.

FIG. 13 illustrates a computer architecture 1300 that may be used in accordance with certain embodiments. In certain embodiments, computing device 100 may implement computer architecture 1300. The computer architecture 1300 is suitable for storing and/or executing program code and includes at least one processor 1302 coupled directly or indirectly to memory elements 1304 through a system bus 1320. The memory elements 1304 may include local memory employed during actual execution of the program code, bulk storage, and cache memories which provide temporary storage of at least some program code in order to reduce the number of times code must be retrieved from bulk storage during execution. The memory elements 1304 include an operating system 1305 and one or more computer programs 1306.

Input/Output (I/O) devices 1312, 1314 (including but not limited to keyboards, displays, pointing devices, etc.) may be coupled to the system either directly or through intervening I/O controllers 1310.

Network adapters 1308 may also be coupled to the system to enable the data processing system to become coupled to other data processing systems or remote printers or storage devices through intervening private or public networks. Modems, cable modem and Ethernet cards are just a few of the currently available types of network adapters 1308.

The computer architecture 1300 may be coupled to a storage device 1316. The storage device 1316 may comprise an internal storage device or an attached or network accessible storage. Computer programs 1306 in storage device 1316 may be loaded into the memory elements 1304 and executed by at least one processor 1302 in a manner known in the art.

The computer architecture 1300 may include fewer components than illustrated, additional components not illustrated herein, or some combination of the components illustrated and additional components. The computer architecture 1300 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A computer system for processing a data management request, comprising:
   at least one processor; and
   a storage device connected to the at least one processor, wherein the storage device has stored thereon a program, and wherein the at least one processor is configured to execute instructions of the program to perform operations, wherein the operations comprise:
   determining user intent that defines properties of target data that is created from source data by performing one of (1) moving and (2) copying the source data to the target data, wherein the user intent describes transformations to be applied on the source data, access constraints on the target data, and lifecycle requirements of the target data;
   determining policies and constraints for the data management request that provide information on how the source data is to be processed to create the target data;
   creating an abstract data management request that identifies the source data, the target data, and the polices and constraints;
   identifying a technology among multiple technologies to based on the user intent and the policies and constraints to perform one of (1) the moving and (2) the copying;
   creating a concrete data management request using the abstract data management request to create the target data from the source data using the technology by performing one of (1) the moving and (2) the copying; and
   selecting a data management engine that is associated with the identified technology and that executes the concrete data management request.

2. The computer system of claim 1, wherein the operations further comprise:
   executing the concrete data management request.

3. The computer system of claim 1, wherein the user intent, policies, and constraints are determined based on responses from the user to questions.

4. The computer system of claim 1, wherein each technology of the multiple technologies has an associated service that creates runtime artifacts that are used by that technology.

5. The computer system of claim 1, wherein the operations for determining the technology further comprise:
   storing a decision table that includes patterns that may be used to implement the data management request, data characteristics describing storage systems that are available for the data management request, and tooling characteristics of tools that are available to implement the data management request; and
   selecting the technology using the decision table.

6. The computer system of claim 1, wherein the operations further comprise:
   tracking progress of the data management request for auditing.

7. The computer system of claim 1, wherein software is provided as a service in a cloud environment.

8. A computer program product for processing a data management request, the computer program product comprising:
   a computer readable storage medium having computer readable program code embodied therewith, the computer readable program code, executable by at least one processor of a computer to perform a method comprising:
   determining user intent that defines properties of target data that is created from source data by performing one of (1) moving and (2) copying the source data to the target data, wherein the user intent describes transformations to be applied on the source data, access constraints on the target data, and lifecycle requirements of the target data;
   determining policies and constraints for the data management request that provide information on how the source data is to be processed to create the target data;
   creating an abstract data management request that identifies the source data, the target data, and the polices and constraints;

identifying a technology among multiple technologies based on the user intent and the policies and constraints to perform one of (1) the moving and (2) the copying;

creating a concrete data management request using the abstract data management request to create the target data from the source data using the technology by performing one of (1) the moving and (2) the copying; and selecting a data management engine that is associated with the identified technology and that executes the concrete data management request.

9. The computer program product of claim 8, wherein the computer readable program code, executable by at least one processor of the computer, to perform a method comprising:
  executing the concrete data management request.

10. The computer program product of claim 8, wherein the user intent, policies, and constraints are determined based on responses from the user to questions.

11. The computer program product of claim 8, wherein each technology of the multiple technologies has an associated service that creates runtime artifacts that are used by that technology.

12. The computer program product of claim 8, wherein, when determining the technology, the computer readable program code, executable by at least one processor of the computer, to perform a method comprising:

storing a decision table that includes patterns that may be used to implement the data management request, data characteristics describing storage systems that are available for the data management request, and tooling characteristics of tools that are available to implement the data management request; and selecting the technology using the decision table.

13. The computer program product of claim 8, wherein the computer readable program code, executable by at least one processor of the computer, to perform a method comprising:

tracking progress of the data management request for auditing.

14. The computer program product of claim 8, wherein software is provided as a service in a cloud environment.

15. A computer system for processing a data management request, comprising:

at least one processor; and hardware logic coupled to the processor, wherein the hardware logic performs operations that comprise:

determining user intent that defines properties of target data that is created from source data by performing one of (1) moving and (2) copying the source data to the target data, wherein the user intent describes transformations to be applied on the source data, access constraints on the target data, and lifecycle requirements of the target data;

determining policies and constraints for the data management request that provide information on how the source data is to be processed to create the target data;

creating an abstract data management request that identifies the source data, the target data, and the polices and constraints;

identifying a technology among multiple technologies based on the user intent and the policies and constraints to perform one of (1) the moving and (2) the copying;

creating a concrete data management request using the abstract data management request to create the target data from the source data using the technology by performing one of (1) the moving and (2) the copying; and selecting a data management engine that is associated with the identified technology and that executes the concrete data management request.

\* \* \* \* \*